Y2587 XR 3,760,162

United States Patent [19]

Holter

[11] 3,760,162

[45] Sept. 18, 1973

[54] PHOTOELECTRIC READERS

[75] Inventor: Godfrey George Holter, Cheltenham, England

[73] Assignee: Smiths Industries Limited, London, England

[22] Filed: Nov. 9, 1970

[21] Appl. No.: 88,015

[30] Foreign Application Priority Data

Nov. 13, 1969 Great Britain .................. 55,594/69

[52] U.S. Cl. 235/61.11 E, 250/219 DC, 235/61.12 N, 235/61.7 B, 340/146.3 AG, 340/149 A

[51] Int. Cl. .... G06k 7/14, G06k 19/08, G06k 9/04, G01n 21/30

[58] Field of Search ................ 235/61.11 E, 61.7 B, 235/61.12 N, 61.6 E; 340/146.3 K, 146.3 AG; 250/219 D

[56] References Cited

UNITED STATES PATENTS

| | | | |
|---|---|---|---|
| 3,379,826 | 4/1968 | Gray | 340/146.3 AG |
| 3,449,585 | 6/1969 | Trehub | 340/146.3 AG |
| 3,472,958 | 10/1969 | Estock | 340/146.3 AG |
| 3,502,851 | 3/1970 | Kakimoto | 235/61.12 R |
| 3,548,160 | 12/1970 | Welsh | 235/61.6 R |
| 3,512,130 | 5/1970 | Hulett | 235/61.7 B |
| 3,184,714 | 5/1965 | Brown | 340/149 A |
| 3,539,778 | 11/1970 | Glorioso | 235/61.11 E |

*Primary Examiner*—Maynard R. Wilbur
*Assistant Examiner*—Robert M. Kilgore
*Attorney*—William D. Hall, Elliott I. Pollock, Fred C. Philpitt, George Vande Sande, Charles F. Steininger and Robert R. Priddy

[57] ABSTRACT

A photoelectric reader used in a money-dispensing system to read information that is impressed on a punched-card blank by a bank-customer's embossed credit-card, includes an extra photo-responsive device that receives reflected light from a part of the blank outside the field of the impressions. Serial energization of light-emitting devices that illuminate the blank is regulated in dependence upon the output of the extra photo-responsive device to tend to maintain this output constant and thereby compensate for temperature and other variations that would otherwise affect the read-out of the information-imprint.

2 Claims, 6 Drawing Figures

Godfrey George Holter
Inventor by Hall, Pollock & Vande Sande
Attorneys

Godfrey George Holter
Inventor by Hall, Pollock & Vande Sande
Attorneys

Godfrey George Holter
Inventor
by Hall Pollock & Vande Sande
Attorneys

PHOTOELECTRIC READERS

This invention relates to photoelectric readers.

According to the present invention there is provided a photoelectric reader wherein one or more photo-responsive devices are arranged to view an illuminated field for sensing marking of a card or other carrier element introduced into the field, and it is arranged that the level of illumination of the field is regulated in accordance with variation in a signal that is derived by a further photo-responsive device to be dependent on said level of illumination, the regulation effected being such as to tend to maintain the signal substantially constant.

The illumination may be effected by light (not necessarily within the visible spectrum) emitted by one or more electric devices included in the reader, and in this case it may be arranged that energization of the one or more light-emitting devices is regulated in dependence upon the signal derived by the said further photo-responsive device. The light-emitting devices may be, for example, tungsten-filament electric lamps or gallium-arsenide devices.

With the photoelectric reader of the present invention the level of illumination of the field viewed by the one or more photo-responsive devices is regulated in such a way as to tend to compensate for variations (arising, for example, from temperature changes) in the response-characteristics of such devices to the extent that such variations are common to the further device. In addition to this, the applied regulation acts towards maintaining a constant level of illumination of the field, so that there is overall compensation for factors, both internal and external to the photo-responsive devices, that might otherwise introduce errors into the read-out provided by the reader.

The one or more photo-responsive devices and the said further photo-responsive device may be each arranged to respond to variations in light reflected from the carrier element. More specifically, the one or more photo-responsive devices may be arranged to discriminate between the presence and absence of a marking at any point of the carrier element (so as to provide a read-out dependent thereon) by virture of the different reflectivities applicable in the two cases. The further photo-responsive device is preferably arranged in these latter circumstances to respond to light reflected from an unmarked part of the carrier element so that the signal it derives is dependent upon the basic reflectivity of the carrier element as well as upon the illumination-level. It is possible in this way therefore, to provide compensation for variations in the basic reflectivity of the carrier element, and this is of particular advantage in allowing for significant variations in quality of carrier element, both as regards the material used and the condition of the marked surface, between one operation and the next of the reader.

The photoelectric reader of the present invention is of especial advantage in arrangements where it is necessary for checking or other security reasons to provide an accurate signal read-out of information that is imprinted, for example in alpha-numeric or bar-characters, on a carrier element. In this respect and according to a feature of the present invention an imprinting and reading arrangement comprises means for imprinting a first part of a carrier element with information-markings, one or more light-emitting devices arranged to illuminate said first part of the carrier element together with a second part outside said first part, one or more photo-responsive devices for responding to light reflected from said first part of the carrier element to provide a signal read-out in accordance with the markings, a further photo-responsive device arranged to provide a control signal dependent on the light reflected from said second part of the carrier element, and means arranged to respond to the control signal to regulate the level of illumination provided by said one or more light-emitting devices and tend thereby to maintain the control signal substantially constant. Such an arrangement may be used with advantage in a dispensing system, for example in a money-dispensing system such as described in U.S. Pat. application Ser. No. 851,186 of G. E. P. Constable, filed Aug. 19, 1969 (now issued as U.S. Pat. No. 3,641,497, in which a record required for accounting or other checking purposes is provided as an imprint (on a punched-card blank or other carrier element) of information borne by a credit card or other token, and operation of the system is to be dependent upon this information as read from the record.

A money-dispensing system that includes photoelectric reader in accordance with the present invention, will now be described, by way of example, with reference to the accompanying drawings, in which.

Figure 1:
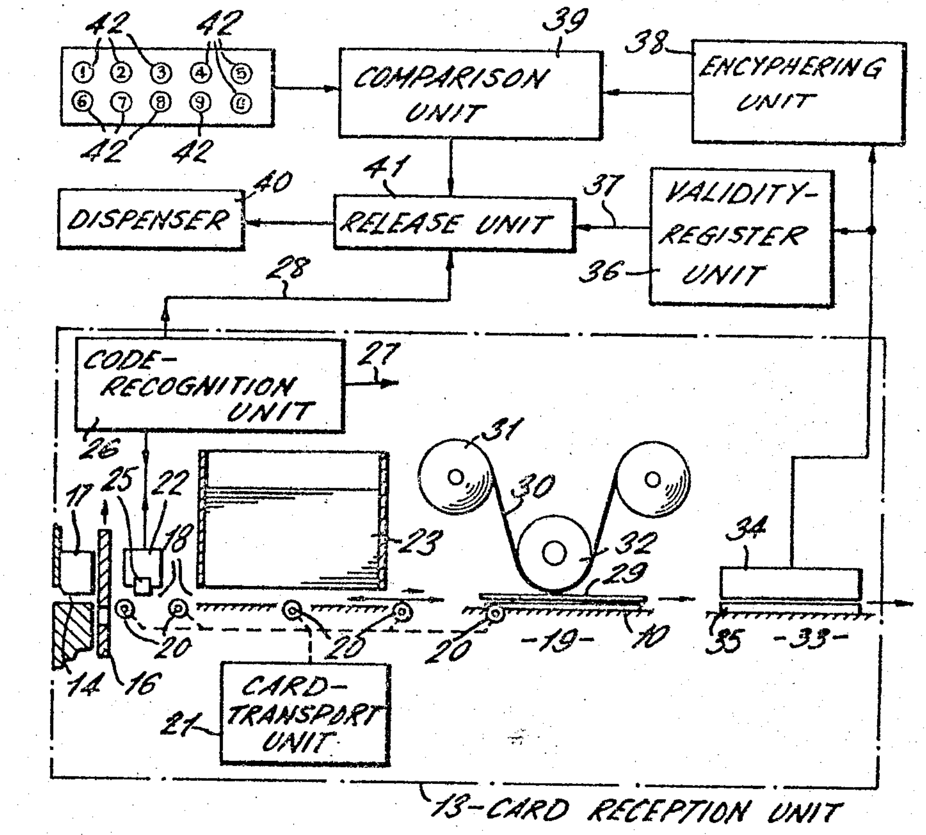
FIG. 1 is a schematic representation of the money-dispensing system.
Figure 2:
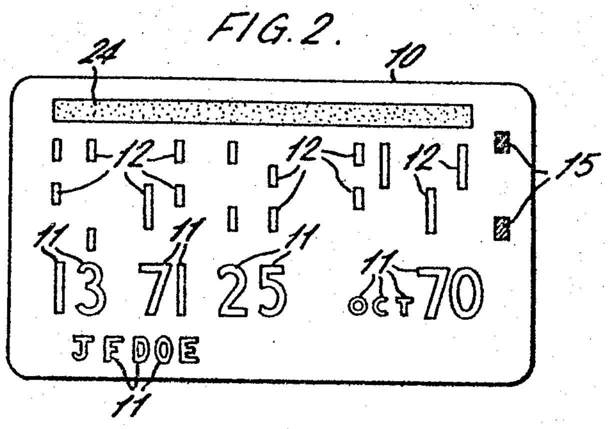
FIG. 2 is a representation of an embossed card used with the system of FIG. 1.
Figure 3:
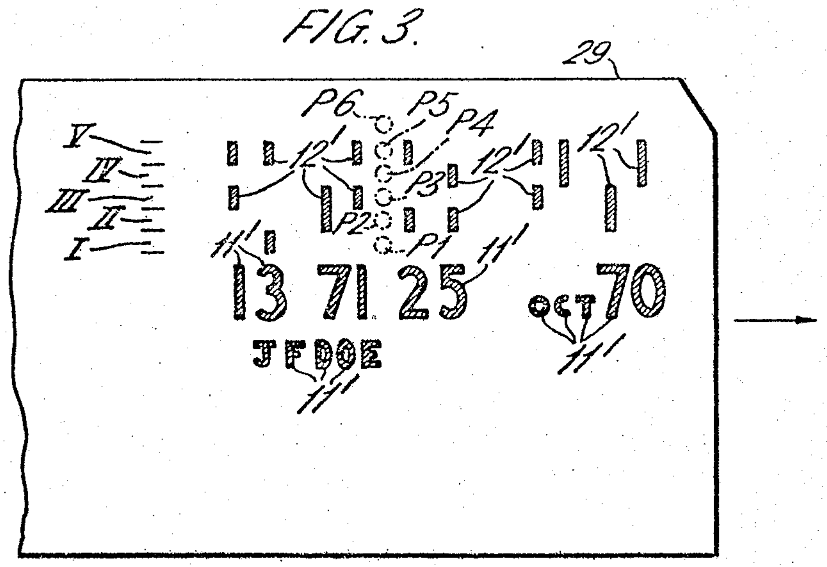
Figure 4:
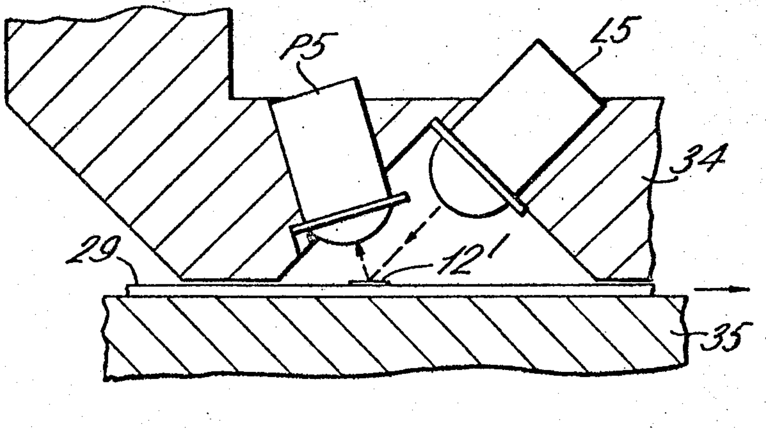
Figures 5, 6:
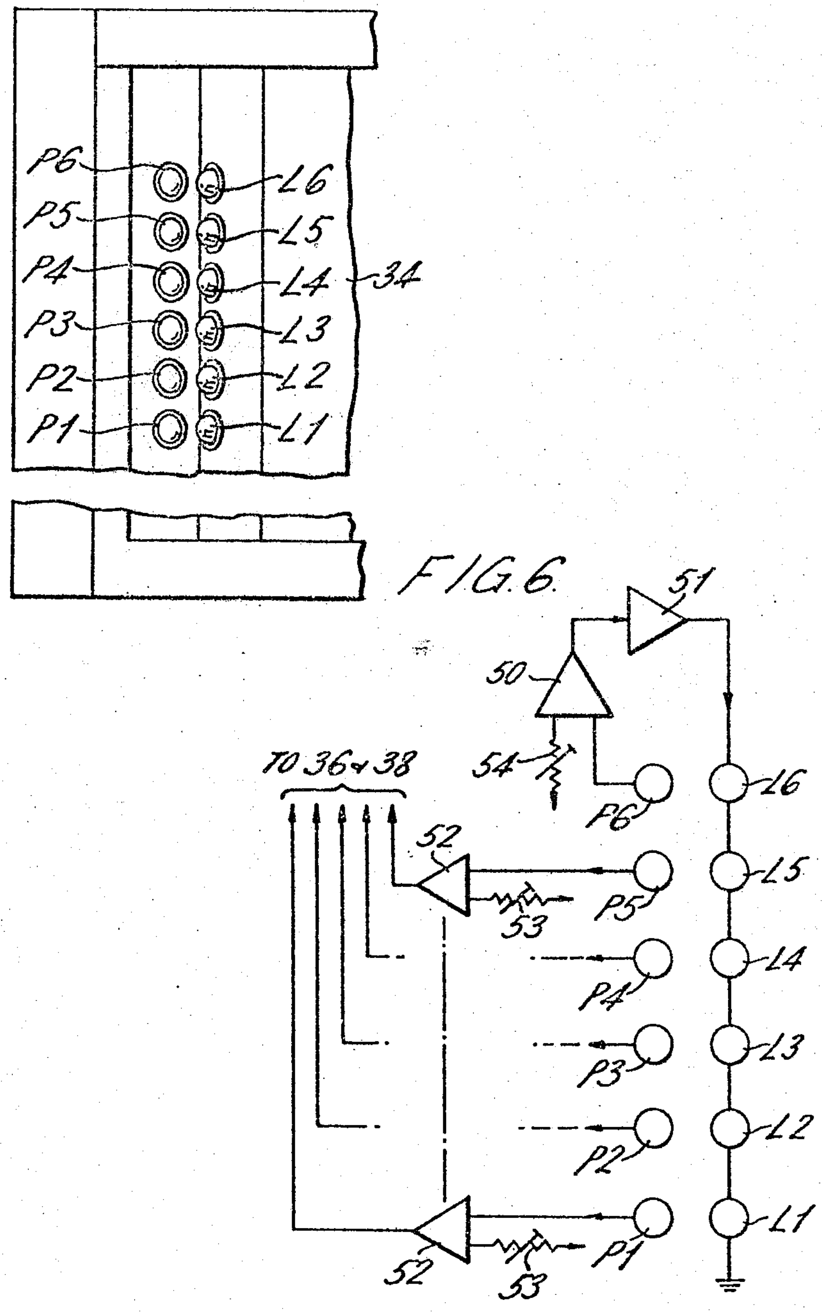

FIG. 3 serves to illustrate the imprinting of a punched-card blank that is effected within the system from the embossed card of FIG. 2;

FIG. 4 is an enlarged sectional side-elevation of the photoelectric reader as used in the system of FIG. 1 to read information from the imprinted punched card blank of FIG. 3;

FIG. 5 is a plan view from below of part of the reading head of the photoelectric reader; and FIG. 6 shows the electrical circuit arrangement of the photoelectric reader.

The money-dispensing system represented in FIG. 1 is operable to dispense packets of bank-notes, one at a time to authorized customers of a bank after, as well as during, normal banking hours. The customers authorized to use the system are each issued with a coded token in the form of a rectangular plastics card 10 that may be used generally as a credit card. Each card 10, as shown in FIG. 2, bears the date of expiry and numerical information identifying the account of the customer to whom the card has been issued, and this information, as well as being embossed directly on the card in alpha-numeric characters 11, is embossed thereon according to a two-out-of-five decimal code using bar-characters 12.

Each customer is informed of a secret, person-identification number that is individual to his account but cannot be deduced from the card 10 itself, and of a maximum permissible rate of use of the card to withdraw packets of bank-notes. For the purposes of the present description it will be assumed that the maximum rate of withdrawal is once in any day.

When the customer wishes to withdraw a packet of bank-notes he presents his card 10 to a card-reception unit 13 of the system. The unit 13 has a facia that is mounted in an external wall of the bank to be accessible from outside and provide an entrance 14 for the card 10. The card 10, which as shown in FIG. 2 carries dark markings 15 at one end, is inserted in the entrance 14 lengthwise with the embossings 11 and 12 uppermost and with the markings 15 just within the unit 13. Entry of the card 10 further is blocked by an apertured shutter 16 until the existence, with appropriate location on the card 10, of the markings 15 is detected by a photoelectric detecting arrangement 17. Detection of the appropriately located markings 15 causes the shutter 16 to be lifted to admit the card 10 fully to the unit 13 through the entrance 14. The card 10 admitted fully to the unit 13 is drawn lengthwise along a guideway 18 to an imprinter 19 by rollers 20 that are driven by a card-transport unit 21. In its passage along the guideway 18 the card 10 passes successively beneath a reading-recording head-unit 22 and a stack 23 of punched-card blanks. The head unit 22 reads from the card 10 withdrawal-rate information that is recorded magnetically in a strip 24 of ferromagnetic oxide inset, as indicated in FIG. 2, lengthwise of the card 10. The information in this case is provided by the date on which the card 10 was last used, and this date is recorded in the strip 24 using a special form of magnetic head having a recording gap of a V-shape configuration. The recording is characterized by a correspondingly V-shape pattern of magnetization, and it is only by using the same head, or one having the same V-shape configuration of gap, that the recorded withdrawal-rate information can be read intelligibly from the card 10. The head unit 22 includes a magnetic head 25 having this specific V-shape configuration of gap, and in conjunction with a code-recognition unit 26 carries out two security checks on the card 10. The first of these is a check on the authenticity of the request for money, to the extent that the unit 26 checks that the level of the signals read out from the card 10 exceeds a predetermined threshold value. This check is satisfied, and a signal is as a result supplied on a lead 27, only if the recording in the strip 24 has the characteristic V-shape pattern of magnetization referred to above.

In the second security check the unit 26 determines from the withdrawal-rate information read from the card 10 whether the dispensing of money to the customer would cause him to exceed the maximum permissible withdrawal rate. To this end the signals supplied by the unit 22 are decoded in the unit 26 to determine whether the date they represent is prior to the current date. If it is, and the once-in-a-day rate would accordingly not be exceeded, an output signal indicative of this fact is supplied from the unit 26 to a lead 28. The supply of this signal to the lead 28, which as described later is a prerequisite for the dispensing of money to the customer, is inhibited in the event that no signal is supplied to the lead 27. Thus the signal appears on the lead 28 after passage of the received card 10 beneath the head unit 22, only in the event that both checks carried out in the unit 26 are satisfied.

From the head unit 22 the card 10 passes beneath the stack 23 of punched-card blanks, and as shown in FIG. 1, carries with it into the imprinter 19 the lowermost blank 29. A carbon ribbon 30 fed from a supply spool 31 within the imprinter 19, is pressed downwardly by a roller 32 on to the blank 29 as this is driven with the card 10 into the imprinter 19. The card 29 is accordingly imprinted in carbon-ink with the embossed characters 11 and 12 of the card 10. The ribbon 30 is of the 'total transfer' kind, the carbon ink tranferred on to the blank 29 at the embossings 11 and 12 leaving transparent windows that provide another, supplementary record of the card 10. The imprinted blank 29, providing the principal record, is now separated from the card 10 and is driven by rollers (not shown) through a photoelectric card reader 33, leaving the card 10 behind in the imprinter 19.

The blank 29 with the imprints 11' and 12' of the embossings 11 and 12 respectively, is shown in FIG. 3, and in the card reader 33 passes between a reading head 34 and a platen 35. The head 34 includes five identical photocells P1 to P5 that are located in line with one another transversely of the path of the blank 29 and looking downwardly towards the platen 35 to sense the imprints 12' of the bar-characters 12. The bar-character imprints 12' occupy a field on the blank 29 that, as indicated in FIG. 3, is notionally divided into five rows I to V extending lengthwise of the blank 29, there being two bar-character imprints 12' in each individual column (extending transversely of the blank 29) to signify the relevant digit-value in the two-out-of-five coding. The imprints 12' in the five rows I to V are sensed by the five photocells P1 to P5 respectively, to provide a column-by-column reading of the imprinted decimal-encoding as the blank 29 is driven lengthwise between the head 34 and platen 35.

Signals in accordance with the account number and expiry date read out from the imprinted blank 29 by the photocells P1 to P5 are supplied from the card reader 33 to a validity-register unit 36. The expiry date and account number are here checked to ascertain whether the card 10 is still in force and not otherwise invalid; in the latter respect the unit 36 checks the account number against the account numbers of customer's cards that are no longer valid by virtue of having been reported as lost or stolen. If the result is satisfactory on both counts, then a signal indicative of this is supplied from the unit 36 to a lead 37.

The signals representative of the account number read out from the imprinted blank 29 are also supplied from the card reader 33 to an encyphering unit 38 which acts according to an involved and secret program to derive from this number the corresponding personal-identification number. Signals in accordance with the personal-identification number derived in this way are conveyed to a comparison unit 39 that controls release of a bank-note dispenser 40 via a release unit 41.

The customer is now instructed by illumination of a sign (not shown) on the facia of the unit 13 to enter his personal-identification number into the system. The number, preferably of six digits, is entered using a set of ten push-buttons 42 mounted on the facia of the unit 13 and numbered 0 to 9. As the push-buttons 42 are operated one at a time to enter the digits sequentially, their values are conveyed to the comparison unit 39. In the unit 39 the manually entered number is compared digit-by-digit with the number derived from the account number in the encyphering unit 38. If there is correspondence between them and the appropriate signals are present on the leads 28 and 37 to signify that the checks as to authenticity, withdrawal-rate and validity carried out in the units 26 and 36 are all satisfied, then the unit 41 releases the dispenser 40 to dispense a single packet of bank-notes to the customer through a delivery-slot (not shown) in the facia of the unit 13.

Once dispensing has taken place the card transport unit 21 drives the rollers 20 to transport the card 10 back from the imprinter 19 to be returned to the customer through the entrance 14. The head 25 in the unit 22 is appropriately energized from the unit 26 during this to record the current date (in the characteristic form) in the strip 24 of the card 10, and thereby up-date the withdrawal-rate information on the card.

The unit 41 does not release the dispenser 40, and no dispensing therefore takes place, in the event that the numbers compared by the unit 39 do not correspond, or any of the three checks on authenticity, withdrawal-rate and validity carried out by the units 26 and 36, are not satisfied. In the circumstances in which there is no correspondence between the compared numbers, or the check on withdrawal rate is not satisfied, the card 10 is returned but without any up-dating of the withdrawal-rate information in this case. The card 10 is however driven from the imprinter 19 to be retained in a safe bin (not shown) within the system, in the event that either of the authenticity- and validity-checks is not satisfied; the criterion for retention and the operation of the unit 21 to this end, is absence of a signal from either of the two leads 27 and 37. In all cases where there is no dispensing, the imprinted punched-card blank 29 is stamped (by means not shown) to indicate this.

The blank 29 imprinted with the information from the card 10 and retained within the system, provides a record of the transaction, whether successful or not, for the necessary accounting and checking purposes. The main basis for the dispensing operation is the information, in particular the account number, encoded on the card 10 and the fact that this is read from the imprinted blank 29 rather than from the card 10 itself, is of substantial advantage. In particular it ensures that the dispensing operation is conditional upon there being an accurate and legible record of the transaction.

The use of the imprinted record 'in the loop' as an essential part of the dispensing operation is the subject of the above-mentioned application Ser. No. 851,186, and depends for success in practice upon the reliability of the card reader 33 in reading the imprints 12' of the bar-characters 12, from the punched-card blank 29. In this respect the card reader 33 is required to provide positive detection of any markings impressed from the bar-characters 12 and to be unresponsive to any normal variation in surface characteristics between one punched-card blank and another. Although an error in response by the card reader 33 in either of these respects will in normal circumstances preclude the dispensing of a packet of bank-notes, erroneous operation in this way where the transaction is otherwise in order, is troublesome. The liklihood of erroneous operation in this way is reduced considerably with the construction of card-reader 33 used in the present instance and illustrated in detail in FIGS. 4 to 6.

Referring to FIGS. 4 and 5, the five photocells P1 to P5 are semiconductor devices and are associated in the reading head 34 with a sixth photocell P6. The photocell P6 is identical to each photocell P1 to P5, and is mounted in line with them transversely of the path of the blank 29 through the reader 33. Each photocell P1 to P6 is mounted in the head 34 at an angle of 15° out of the vertical to view downwardly towards the platen 35 and receive infra-red light reflected upwardly from the blank 29. The light originates from six gallium arsenide emitter devices L1 to L6 that are associated respectively with the six photocells P1 to P6 and direct light downwardly onto the blank 29 in a general direction at 45° out of the vertical.

The photocells P1 to P5 supply signals in accordance with the imprinting within the five rows I to V, each individual photocell P1 to P5 sensing the imprints 12' within its respective row I to V by virtue of the transitory reductions in reflected light produced as they pass beneath the relevant emitter device L1 to L5. The photocell P6, on the other hand, is located to view the blank 29 outside the field occupied by the rows I to V and to be unresponsive to any imprinting within this field. In particular, the cell P6 is located to view a part of the margin of the blank 29 beyond the row V so that its response is dependent upon the level of illumination provided by the emitter device L6 and the reflectivity of the unmarked surface of the blank 29. The signal derived by the photocell P6 is used to regulate the energization of the emitter devices L1 to L6, so as thereby to compensate for factors that would otherwise undesirably affect the operation of the photocells P1 to P5.

Referring to FIG. 6, the signal derived by the photocell P6 is applied to an amplifier-stage 50 and thence via a power amplifier 51 to energize the six emitter devices L1 to L6 in series. The signals derived by the photocells P1 to P5, on the other hand, are applied to respective amplifier-stages 52 for application therefrom to the units 36 and 38. The amplifier-stages 52 ar responsive only to signals having a magnitude in excess of a pre-set threshold level, so as to provide discrimination in the output signal of each stage 52 between the circumstances in which there is no bar-character imprint 12' in the field of view of the respective photocell P1 to P5 and the circumstances in which there is. The threshold level of each amplifier-stage 52 in this respect is pre-set by means of an individual variable resistor 53.

The level of signal derived by each photocell P1 to P5 tends to be influenced by factors other than the presence or absence of a bar-character imprint 12' within the field of view of that photocell, with the consequent possibility that the output signals of the amplifier-stages 52 may not then always be truly representative of the imprinted information. Of the factors involved, a first is the level of illumination provided by the emitter device L1 to L5, and this may vary with the level of energization and ageing of the devices themselves. Secondly there is the reflectivity of the surface of the punched-card blank 29, and this may vary along the length of theindividual blank (for example, owing to the presence of dirt or smudging of the carbon-ink) and also from one blank to another in the stack 23. Thirdly there is the response-characteristic of the photocell itself, and this may vary in the long term with age and in the short term with effects such as increase in temperature occurring during passage of the blank 29 through the card reader 33. The regulation of the energization of the emitter devices L1 to L6 provided in accordance with the signal derived by the photocell P6, is effective to compensate for variations in the first two factors and also compensates for variations in the third factor to the extent that such variations are common to the six photocells P1 to P6.

The magnitude of energization current supplied to the emitter devices L1 to L6 is pre-set to a datum value by means of a variable resistor 54 associated with the amplifier-stage 50, and variation in the signal derived by the photocell P6 from a corresponding value is effective to vary the magnitude of the energization current from the datum value. The variation in energization current is made degeneratively so as to tend to maintain the signal derived by the photocell P6 substantially constant and thereby achieve the compensatory effect with a consequential reduction in the likelihood of erroneous read-out.

The form of photoelectric reader described above has advantages additional to those mentioned. These additional advantages arise from the specific construction used, and in particular from the close location of the photocells P1 to P6 to the platen 35. For example, in one form of photoelectric reader constructed as illustrated, the spacing is such that there is only some 0.05 inch between the photocells P1 to P6 and the upper surface of the imprinted blank 29 passing through the reader. In this way it is readily possible to arrange that a bar character-imprint 12' (for example from an embossing 12 of width 0.04 inch and length 0.08 inch) when positioned beneath a photocell P1 to P5 occupies the whole, or at least a substantial part, of the total field of view (half-angle width of, for example, 35°) of that individual photocell. The photoelectric reader as a result tends to be less sensitive to deficiencies, such as voids or uneveness, in the imprinted character, than otherwise would be the case. Furthermore this specific construction has the advantage of not involving any special lens system (separate from the inbuilt lenses of the photocells themselves) used in earlier constructions, to cast images of the imprints on to the sensing photocells.

The present invention, although described above as applied solelu to the photoelectric reader 33, may equally well be applied to the photoelectric detecting arrangement 17 in the detection of the existence and location of the markings 15 on the card 10 presented to the unit 13 through the entrance 14.

Although the invention has been described above in relation to a money-dispensing system, its application is not limited to this. Furthermore, although the particular photoelectric reader described above depends upon reflection from an imprinted record element (blank 29), the present invention is not limited to the circumstances in which it is reflected light that is sensed. Instead, where information is carried by a carrier element as punched-hole 'markings', then it may be the light transmitted through the holes that is sensed in providing the read-out; in this case the further photocell used for regulating the level of illumination, may be arranged to respond solely to light as emitted by part at least, of the light source.

Details of the construction and use of the magnetic security head 25 and of the encyphering unit 38 referred to above in relation to FIG. 1, are contained in co-pending U.S. Pat. application Ser. Nos. 66,181 and 66,182, both filed in the name of G. E. P. Constable on Aug. 24, 1970. Furthermore, the above-mentioned U.S. Pat. application Ser. No. 851,186 and also U.S. Pat. application Ser. Nos. 851,187 and 851,301 (now issued as U.S. Pat. Nos. 3,611,293 and 3,629,834) both filed Aug. 19, 1969, in the names respectively of W. E. Randall and G. E. P. Constable, and of G. E. P. Constable and D. A. Lloyd, each describes a form of money-dispensing system that involves on-line communication between each of a number of money-dispensing terminals and a central station that serves to check and update the account-status of each customer making a request for withdrawal of money; although the system described in the present specification is not of this form, the invention is nonetheless just as applicable to on-line systems.

I claim:

1. A photoelectric reader for reading data markings from a carrier element introduced into an illuminated field of said reader, comprising: light-emitting means for emitting light to define said illuminated field, said light-emitting means being controllable to vary selectively the intensity of illumination of said field; a plurality of photo-responsive devices mounted in a mutually spaced relationship to sense the markings of the introduced carrier element by responding to light from individual regions of the carrier element and thereby provide signals in accordance with the data borne by said carrier element; a further photo-responsive device for deriving a control signal dependent on the level of illumination of the said field; means mounting the further photo-responsive device to view a portion of said illuminated field so as to respond to light from only a part of said carrier element lying outside any of said regions; and means responsive to variation of said control signal for regulating the level of illumination of said field to tend to maintain said control signal substantially constant, said regulating means including means for controlling said light-emitting means to vary said illumination intensity in accordance with variation in the control signal supplied by said further photo-responsive device.

2. A photoelectric reader for sensing marking of a carrier element introduced into an illuminated field of said reader, comprising: electric light-emitting means for emitting light to define said illuminated field, said light-emitting means comprising a plurality of electric light-emitting devices connected in series with one another; a plurality of photo-responsive devices mounted in a mutually-spaced relationship to sense the marking of the introduced carrier-element by responding to light reflected from individual regions of the carrier element; a further photo-responsive device for deriving a signal dependent on the level of illumination of the said field, means mounting the further photo-responsive device to view a portion of said illuminated field so as to respond to light reflected from a part of said carrier element lying outside any of said regions; means responsive to variation of said signal for regulating the level of illumination of said field to tend to maintain said signal substantially constant, said regulating means including means for varying energization of the said serially connected light-emitting devices in dependence upon variation of the signal supplied by said further photo-responsive device; means mounting said plurality of photo-responsive devices in line with said further photo-responsive device; and means mounting the light-emitting devices to lie in a line substantially parallel to the line of photo-responsive devices.

* * * * *